(12) United States Patent  (10) Patent No.: US 8,719,836 B2
Groschel et al.  (45) Date of Patent: May 6, 2014

(54) METHOD AND DEVICE FOR OPERATING A SECONDARY OPERATING SYSTEM AUXILIARY TO A PRIMARY OPERATING SYSTEM

(75) Inventors: Andreas Groschel, Vogt (DE); Jorg Ehrlinspiel, Illmensee (DE); Stefan Zintgraf, Weingarten (DE)

(73) Assignee: KUKA Laboratories GmbH, Augsburg (DE)

( * ) Notice: Subject to any disclaimer, the term of this patent is extended or adjusted under 35 U.S.C. 154(b) by 1948 days.

(21) Appl. No.: 10/595,348

(22) PCT Filed: Oct. 14, 2004

(86) PCT No.: PCT/EP2004/011526
§ 371 (c)(1),
(2), (4) Date: Apr. 11, 2006

(87) PCT Pub. No.: WO2005/038651
PCT Pub. Date: Apr. 28, 2005

(65) Prior Publication Data
US 2006/0282698 A1  Dec. 14, 2006

(30) Foreign Application Priority Data
Oct. 16, 2003  (DE) .................................. 10 348 113

(51) Int. Cl.
*G06F 9/54*  (2006.01)
*G06F 9/46*  (2006.01)

(52) U.S. Cl.
USPC ........................... 718/108; 719/319; 719/321

(58) Field of Classification Search
None
See application file for complete search history.

(56) References Cited

U.S. PATENT DOCUMENTS

| 5,483,647 A | 1/1996 | Yu et al. |
| 5,708,818 A | 1/1998 | Munz et al. |
| 6,996,828 B1 * | 2/2006 | Kimura et al. ................ 719/319 |
| 2004/0205755 A1 * | 10/2004 | Lescouet et al. .............. 718/100 |

FOREIGN PATENT DOCUMENTS

| DE | 4406094 A1 | 8/1995 |
| EP | 1054322 | 11/2000 |
| EP | 1162536 A1 | 12/2001 |
| WO | WO98/09225 | 3/1998 |
| WO | WO98/12635 | 3/1998 |

OTHER PUBLICATIONS

EBM Corp., "Dual System Operation", IBM Technical Disclosure Bulletin, Apr. 1970, US, vol. 12, Nr. 11, pp. 1899-1900.
Jaluna SA, "Jaluna-2 Preview Release 1 Description", Jaluna Report XP-001189063, Dec. 2202, pp. 1-32.

* cited by examiner

*Primary Examiner* — H S Sough
*Assistant Examiner* — Kimberly Jordan
(74) *Attorney, Agent, or Firm* — Wood, Herron & Evans, LLP

(57) ABSTRACT

For operating two operating systems of a computer without performance loss, the invention proposes a method in which a secondary operating system driver (SOS driver) of the primary operating system is loaded for loading and controlling the secondary operating system and which subsequently loads the secondary operating system. The invention also provides a device with a corresponding secondary operating system driver (SOS driver) of the primary operating system for driving a board support package.

30 Claims, 4 Drawing Sheets

METHOD AND DEVICE FOR OPERATING A SECONDARY OPERATING SYSTEM AUXILIARY TO A PRIMARY OPERATING SYSTEM

CROSS REFERENCE TO RELATED APPLICATIONS

This application is a United States National Phase application of International Application PCT/EP2004/011526 and claims the benefit of priority under 35 U.S.C. §119 of German Patent Application DE 103 48 113.3 filed Oct. 16, 2003, the entire contents of which are incorporated herein by reference.

FIELD OF THE INVENTION

The invention relates to a method and a device for operating a secondary operating system on a computer in addition to a primary operating system.

BACKGROUND OF THE INVENTION

The operation of two operating systems loaded on a computer, more precisely in the random access memory of a computer, not only alternatively, but alternately without restarting the computer is known.

Thus, WO 98/09225 discloses an operating system for real time extension for conventional, intrinsically not real timable, Microsoft Windows systems through special microkernels.

DE 44 06 094 C2 also discloses a real time extension of conventional Microsoft Windows systems by means of a complete real time operating system, which can also be run separately, i.e. independently of Windows on a computer. The secondary real time operating system has direct access to a single subset of the processor register and hardware components of the computer.

It is also known to emulate under an operating system a virtual computer or machine on which a second operating system can run. The secondary operating system is under the control of the monitor program emulating the virtual computer. The secondary operating system cannot directly access all the processor registers, but instead this only takes place under the control of the monitor program. It is problematical in the prior art that the source code of at least one of the operating systems must be known, because during operation in parts thereof not disclosed normally by the supplier intervention takes place or changes must be made to such parts and in particular the same parts on at least one of the operating systems. It is also disadvantageous if one operating system must run "under" another, i.e. is embedded in the latter.

SUMMARY OF THE INVENTION

The object of the invention is to provide a method and a device by means of which at least two operating systems can be run on a computer without reducing their performance and in particular whilst maintaining real time capacities without intervening in the secondary operating system and at the most with interventions in its board support package. However, when the secondary operating system is active it operates on the central processor unit (CPU) as if it was loaded as the sole operating system and can therefore access the entire processor and its virtual memory area without any restriction.

According to the invention the set problem is solved by a method of the aforementioned type, which is characterized in that a secondary operating system driver (SOS driver) of the primary operating system is loaded for loading and controlling the secondary operating system.

A device for operating a secondary operating system on a computer in addition to a primary operating system therefore provides a secondary operating system driver (SOS driver) of the primary operating system for loading and controlling the secondary operating system.

According to the invention access of the secondary operating system takes place without the aid of the primary operating system.

In the development where both operating systems are implemented in juxtaposed manner on a computer means that both operating systems operate completely independently of one another thereon and in particular the operating systems do not presuppose one another, i.e. the secondary operating system does not presuppose the operable presence of the primary operating system. The system driver is exclusively used for changing operating systems. Thus, the entire security area of the POS, including the system driver, could be overwritten into the SOS without impairing its function, but then a return to the POS is naturally impossible. This more particularly implies that one operating system (particularly the secondary operating system) is not set up on the other, particularly the primary operating system or would only access the same. During the operation of one operating system no code part of the other is executed. In particular, during its operation, the secondary operating system does not access the system driver. Thus, according to the invention, no one operating system is embedded in the other, i.e. does not permanently presuppose the same This more particularly applies to the secondary operating system relative to the primary operating system. For polling and running one operating system, particularly the secondary operating system, there is no need for any informations from the other operating system, namely the primary operating system, including the system driver in the first-mentioned operating system (secondary operating system). Both operating systems and in particular also the secondary operating system run in a completely autonomous manner.

As a result of the inventive provision of a driver of the primary operating system for driving and loading the secondary operating system via its board support package, it is also ensured that there is no need to modify the core or kernel of the secondary operating system for the operation thereof as a secondary operating system alongside a primary operating system.

The board support package is the software forming the connection between hardware (i.e. the board) and an operating system (i.e. the support). Operating systems used on several platforms (hardware environment, including processor, memory, etc.) always have a BSP and which is consequently a fixed component of the operating system. Embedded operating systems, such as Windows CE, comprise an operating system kernel and the BSP, through whose modification the operating system can be and must be adapted to a specific hardware platform without having to know the operating system kernel.

The board support package of an operating system is regularly disclosed by the operating system supplier in the source code, because it in particular contains the so-called basic hardware services by means of which for the operating system in question the necessary interfaces are provided to the hardware, such as e.g. interrupt controllers and system timers and which have been developed for this purpose for use on different hardware systems, i.e. different CPU platforms, in the same way as manufacturer-specific hardware, which in particular differs from the quasi-standard. Thus, through the solution according to the invention it is possible to use all operating systems as a secondary operating system, which with the aid of a board support package can be configured and adapted without any loss to the performance thereof when used as a secondary operating system and, to the extent that they are real time operating systems, without losing their real time capacity.

In a preferred development, the inventive method provides for the fact that on changing the dependence of the operating systems there is a replacement of interrupt tables in the volatile memory. Thus, the device according to the invention is constructed to this end. Thus, as a result of the information provided by the interrupt table entries of the secondary operating system during an interrupt in the secondary operating system the correct interrupt service routine of the secondary operating system is started, so that from this standpoint the process is the same as if there was no primary system. Thus, in this way it is possible to operate in parallel or side by side two operating systems without knowledge of the source code. Thus, according to the invention, in this way no primary operating system information is stored in the secondary operating system memory area. Neither operating system has any information on the other system.

In a preferred development of the method according to the invention, the secondary operating system driver (SOS driver) loaded with the primary operating system loads the secondary operating system in a memory area of the physical random access memory and preferably the upper area thereof not used by the primary operating system.

According to a preferred development, in the computer processing unit (CPU) are created memory contexts (virtual operating areas) and in particular the SOS driver can set up in the CPU a tunnel context by means of which it is possible to switch a change to the operation of the operating systems. The virtual operating area referred to as a context comprises random blocks of the physical memory. A memory management unit (MMU) manages such contexts in a memory allocation table called MMU table and which is used for writing the context. From the programming standpoint operation takes place in the virtual address area referring to the physical memory through the operation of the MMU.

According to a further development, following the loading of the secondary operating system an entry takes place into the same and more precisely into the board support package, which in a further development sets up a context for booting the secondary operating system in the processor.

According to a further development, into the tunnel context is inter alia loaded a tunnel memory page contained in the driver and into which the program sequence is branched. Then, by means thereof, program codes of the secondary operating system are loaded into the new memory context and the complete booting process of the secondary operating system is continued.

For performing the aforementioned method steps, according to a preferred development of the inventive device, the SOS driver has a SOS loading section and a tunnel area containing the tunnel memory page.

In a preferred development of the inventive method, after loading or during any operation of the secondary operating system, there is a change from the latter to the primary operating system either when the secondary operating system is idling (entry thereof into its idle loop) or through a corresponding return instruction in the program sequence of the secondary operating system for a return to the primary operating system.

For performing this method step, in the device according to the invention the board support package has a corresponding return section.

In another preferred development of the inventive method, there is a change from the primary operating system to the secondary operating system as a result of a SOS interrupt request intended for the secondary operating system.

For this purpose the SOS driver has an interrupt table section by means of which it generates in the primary operating system an interrupt polling or call table (interrupt table), which inter alia contains a poll of the interrupt servicing routine for polling the secondary operating system.

In a preferred development of the inventive method, an interrupt servicing routine in the SOS driver reads the interrupt table of the secondary operating system and the processing of the latter takes place or is continued at the point concerning the interrupt poll or call.

If there is an interrupt call not intended for the primary operating system, the SOS system driver intercepts it and transfers it via the board support package to the secondary operating system, so that according to the invention there is a change between the operating system by means of the primary operating system SOS driver and the secondary operating system board support package.

More particularly and as far as a processor does not support the direct change of contexts, according to a further development of the invention, the change in activity of the operating systems takes place by means of a tunnel area in the tunnel context set up in addition to the primary operating system and also the secondary operating system context.

According to a preferred development of the inventive method, on changing from one operating system to the other all the system states (in the random access memory) are stored, particularly all the CPU registers and preferably in addition all the processor-internal caches are emptied. In a corresponding further development on changing from one operating system to the other, the new system states of the other operating system, particularly CPU register contents and memory management (MMU) tables are loaded into the processor.

Finally, according to a further development of the invention, the timing for the secondary operating system takes place through the main hardware timer, i.e. only the secondary operating system has access thereto, whilst the timing for the primary operating system takes place through a timing system driver. This is in particular provided and is advantageous if the secondary operating system is a real time operating system for controlling an industrial plant or machine, whereas the primary operating system is operated by an operator and makes available to him for operational purposes an ergonomic, graphic surface.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
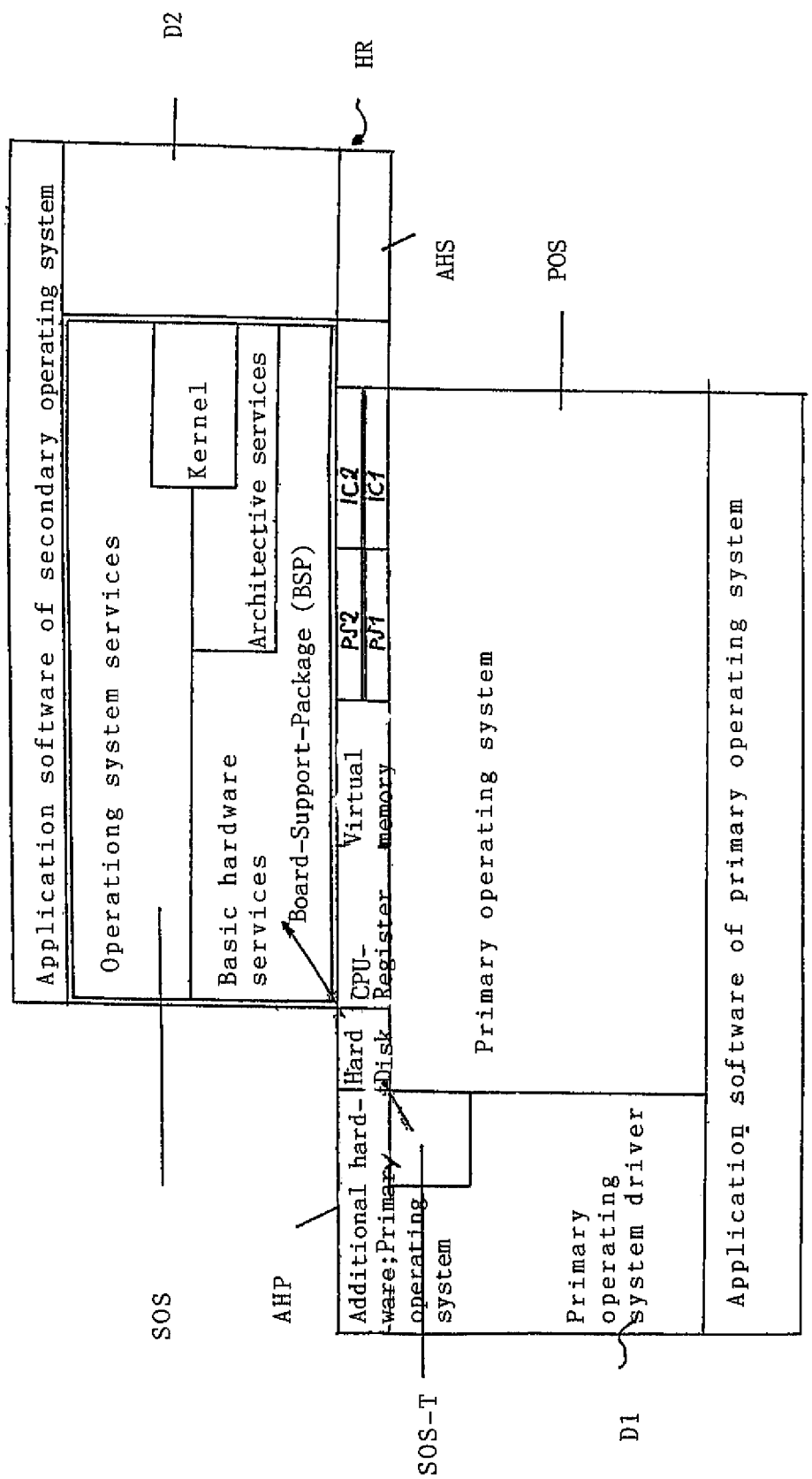
FIG. 1 is a view showing the allocation of primary and secondary operating systems to the individual resources of a computer and the design of an operating system using the example of the secondary operating system.

Referring to the drawings in particular, FIG. 1 shows the allocation of the hardware resources (HR) of a computer to the primary operating system (POS) and to the secondary operating system (SOS) within the scope of the present invention. It also shows the fundamental design of an operating system using as the example the secondary operating system SOS.

An operating system firstly has a kernel K as the central core thereof. It also has a board support package (BSP) in which are implemented the basic hardware services (BHS). For the operating system the latter provide the necessary interfaces to the hardware, such as to the interrupt controller, system timer, etc. The BHS make it possible for the operating system to be used on different hardware systems. Normally the BSP is made available in source form by the manufacturer, so that the hardware manufacturer can adapt the operating system to his hardware.

The operating system has further architecture services (As), which form the interfaces necessary for the operating system to the CPU-specific services, such as exception and interrupt processing and MMU management. The As make it possible for the operating system to operate on different CPU platforms.

The operating system also has generic operating system services (OSS), which make available application software AS (AS1, AS2), high-quality services, such as memory management, network services, multitasking services, etc. In an operating system normally only the BSP is available in source form, whereas adaptations of architecture and generic operating system services are impossible. It is also possible to see the physical memories PS1 and PS2 associated with the two operating systems, together with parts of the interrupt controls IC1 and IC2 controlling the interrupts for the POS and SOS.

As can be gathered from FIG. 1, important resources of the computer for the operating system are allocated in the following way:

At the time of their activity, both operating systems use the entire virtual memory (VM) and all the CPU registers (CPU-R), such as in particular the standard register, floating point register, control register, etc. Both operating systems initially share the random access memory (RAM), each operating system having part of said memory and the secondary operating system (SOS) is preferably loaded into the upper part of the RAM. They also share the interrupt controller (IRC), clear interrupts being allocated to each operating system.

The secondary operating system has in particular sole access to the system timer (ST), whilst the primary operating system (POS) has sole access to the hard disk (HD). To the particular operating system are allocated drivers T1 (of the primary operating system) or T2 (of the secondary operating system), inter alia for managing the particular allocated additional hardware AHP for the primary operating system and AHS for the secondary operating system.

One of the drivers of the primary operating system is the SOS-T driver for loading the secondary operating system.

Figure 2:
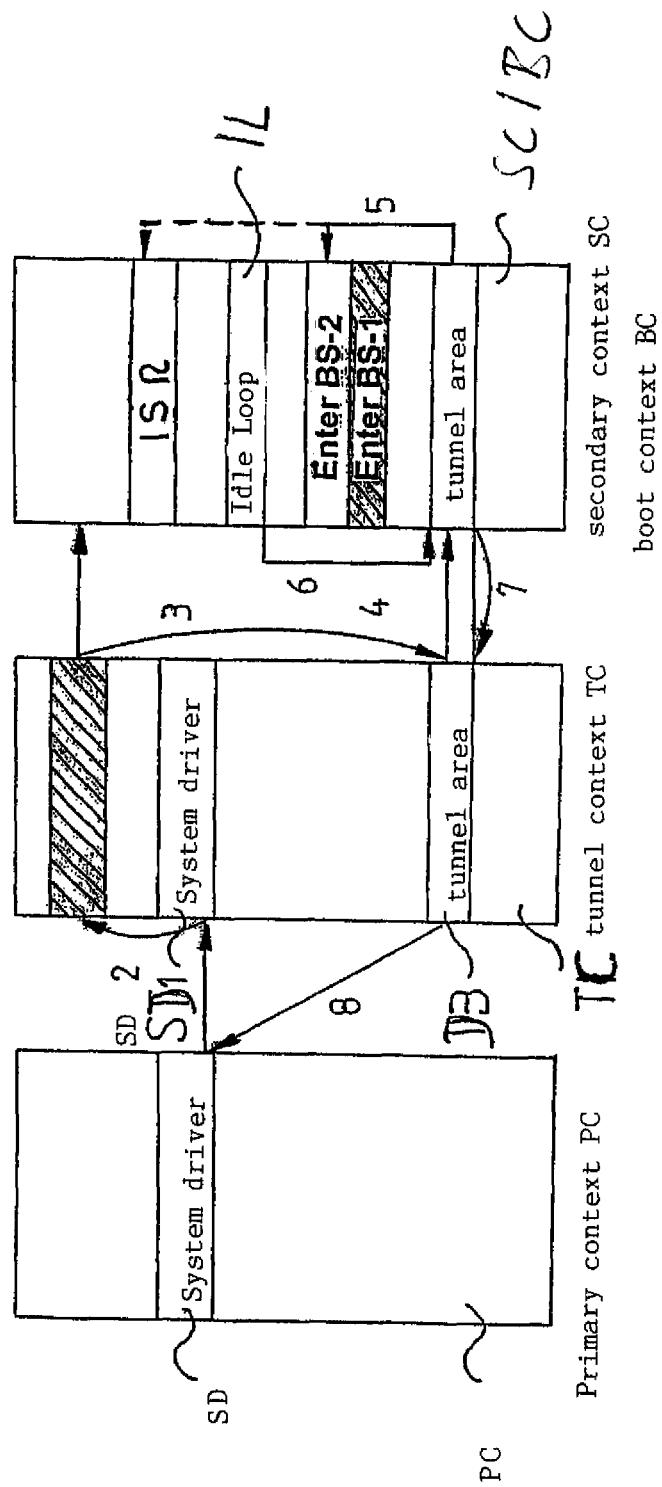
FIG. 2 is a diagram concerning the process of loading the secondary operating system and, when the latter is idle, the return to the primary operating system.

FIG. 2 illustrates the loading of the secondary operating system (SOS).

It is firstly assumed that the primary operating system (POS) is loaded conventionally by means of a boot loader into the computer memory and that the system driver SOS-T for the secondary operating system (SOS) also has been loaded.

After loading the primary operating system (POS), the SOS-T firstly loads the secondary operating system (SOS) into a separate memory area of the RAM not used by the POS and preferably the upper area of the physical RAM, so that the secondary operating system driver SOS-T forms the boot loader for the SOS.

Besides the memory context for the primary operating system (POS) set up in the conventional way, for the use of the secondary operating system the system driver firstly sets up a context BC for booting the secondary operating system and a tunnel context TC in the CPU for changing between the contexts PC of the primary operating system and the BC.

Entry from the system driver SOS-T into the secondary operating system takes place following the loading process in the board support package of the SOS (steps 1 and 2 in FIG. 2). As is indicated by the arrow, the system driver SOS-T is exclusively required for the change from the primary to the secondary operating system. The program processing is then continued in the secondary operating system board support package. The board support package sets up the context BC required for SOS booting. The program sequence is then branched into tunnel area TA of the tunnel context TC (step 3), the boot context BC is loaded (step 4) and the secondary operating system booting process is continued (step 5). The SOS sets up its own context in which branching takes place during each future POS to SOS change. For this purpose the tunnel area contains the "switching code" between the boot loader or secondary context and the tunnel context. The tunnel area comprises precisely one memory page in which is filed the switching code. In all contexts (tunnel context and boot loader or secondary context) said switching code is located at the same virtual address.

After changing to the secondary operating system (SOS) and during the operation thereof, the system driver SOS-T is no longer required by the secondary operating system and does not access the latter or other parts of the primary operating system (POS) and also does not make use of the same. To this extent the secondary operating system operates completely autonomously.

If the secondary operating system (SOS) enters an idle state or loop (IL), there is automatically a return to the primary operating system (steps 6, 7 and 8). For as long as the secondary operating system is active, interrupt calls which appear are exclusively processed by the SOS.

Prior to loading the secondary operating system (SOS) and during each change to it, all the registers of the CPU primary operating system are stored and the CPU-internal caches are emptied.

On loading the secondary operating system and on changing to it, all the secondary operating system CPU registers and the MMU tables thereof are loaded.

On changing from the secondary operating system (SOS) to the primary operating system (POS), there is a saving of the system states of the secondary operating system and the loading of system states for the primary operating system in a corresponding way.

If the central processing unit (CPU) supports a direct change of contexts, such as is e.g. the case with the Intel-X86 architecture, via task-safe segments, there is also no need for the tunnel context, so that the change between operating systems can take place directly via the primary context (PC) and secondary context (SC).

A change of activity of the primary operating system (POS) for polling and for activity of the secondary operating system (SOS) takes place exclusively as a result of an interrupt intended for the latter. If this occurs the system driver (SD) and the BSP of the secondary operating system are branched into the memory context (MC) of the secondary operating system (SOS) and run there the corresponding allocated interrupt service routine.

Figure 3:
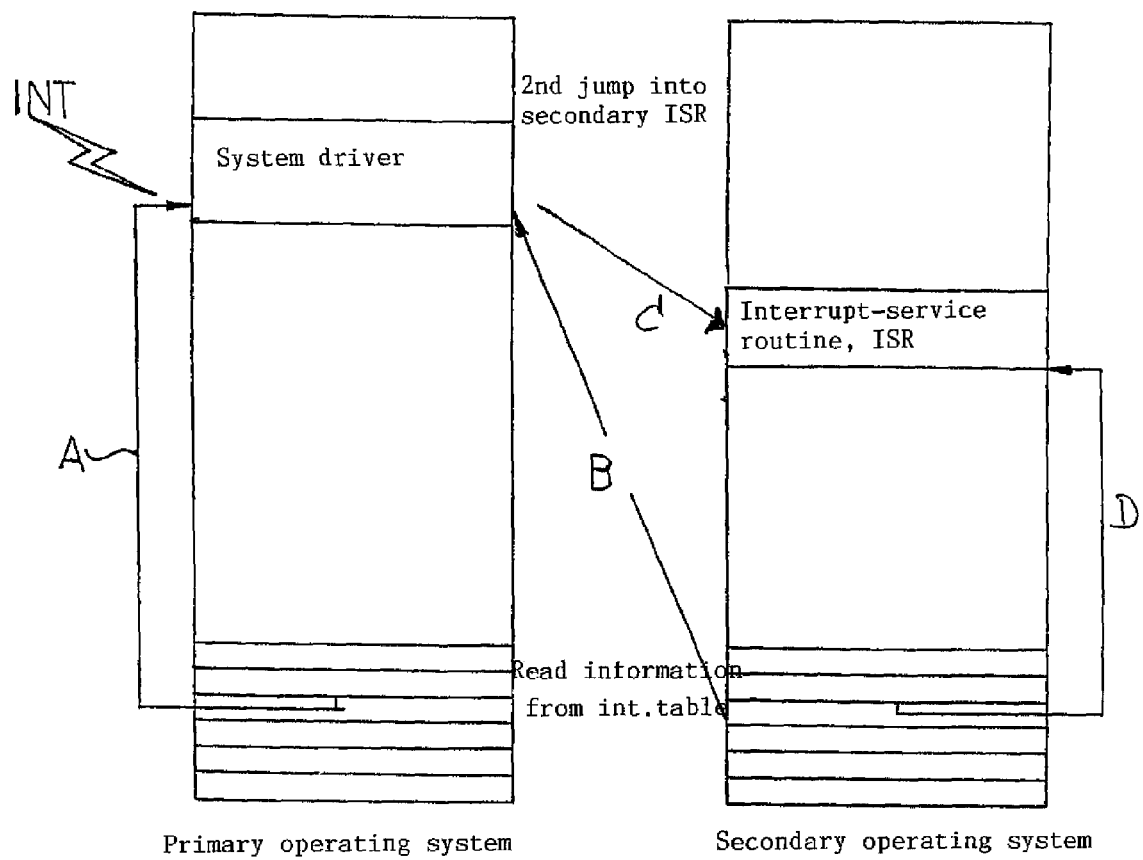
FIG. 3 is a view showing a change from the primary operating system to the secondary operating system.

During activity of the primary operating system for a change to the secondary operating system, the steps represented in FIG. 3 are performed:

If the primary operating system is active and there is an interrupt, the CPU as a result of the interrupt request branches directly into the system driver (step A) and the interrupt is intercepted by the system driver. The system driver (SD) saves all the processor registers and changes to the tunnel context (TC) (FIG. 2). The system driver branches directly into generic interrupt processing of the secondary operating system BSP. Then, directly by means of or through access to the SOS interrupt table it is established where the interrupt service routine (ISR) of the secondary operating system is located and to where processing is to branch (step B).

From the system driver via the tunneling function activating the secondary operating system context (SC) (step C), the generic interrupt processing branches directly into the interrupt processing function (ISR) in the secondary operating system (SOS) (step D) and not via any specific code of the SOS, which is not required and is not present according to the invention.

The secondary operating system (SOS) is then run until all the processes deliver their computing time and are consequently branched into the idle loop of the SOS.

When the SOS is active and an interrupt occurs for the same, without further interventions, there is automatically a polling of the interrupt service routine (ISR). The processor jumps to this, because during the change from the primary operating system in conventional manner to the secondary operating system the interrupt table in the processor is changed, i.e. during said change the interrupt table of the secondary operating system (SOS) is set. Thus, FIG. 3 only shows step D. It is consequently also possible to cancel the primary operating system (POS) and its system driver, without there being any limitations to the secondary operating system (SOS).

From the idle loop and via the tunnel area there is a change to the tunnel context (TC) (steps 6 and 7 in FIG. 2). The tunnel function then returns to the system driver of the primary operating system (POS) (step 8), from where it again activates the primary context (PC) and continues the operation of the POS.

As an alternative to the use of the idle loop (IL) of the secondary operating system (SOS) as the entry point for changing to the primary operating system, it is possible to initiate said change using a regular process in the SOS. For this purpose the SOS has a function which can be polled by processes. Polling then branches back again to the primary operating system (steps 6 to 8) until the next interrupt for the SOS occurs.

Figure 4:
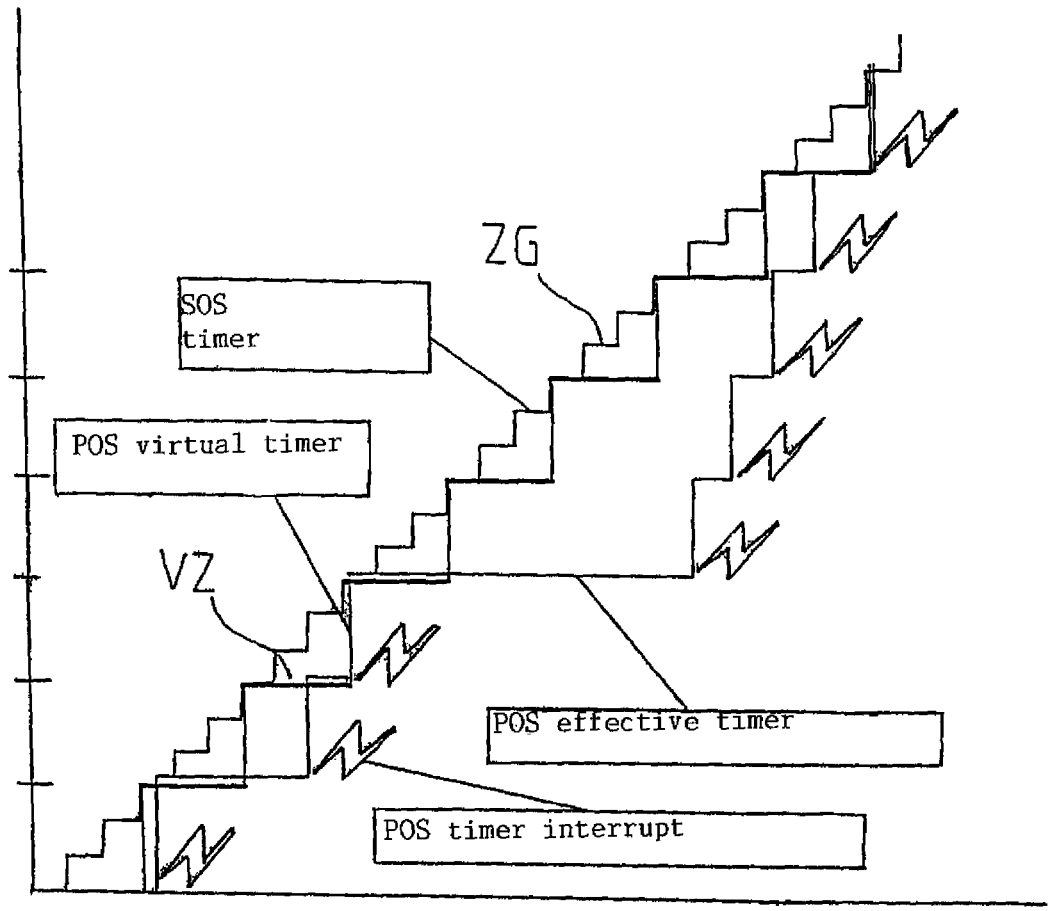
FIG. 4 is a graphical view showing a representation for the synchronization of the clock of the primary operating system.

As stated hereinbefore, the main system timer (MST) is controlled by the secondary operating system (SOS). For this purpose the primary operating system is so modified, e.g. by patches, that all accesses to the main system timer (MST) are intercepted by the system driver (SD). The latter stores informations as to the clock rate for operating the primary operating system (POS). The clock rate in the secondary operating system must be higher than that of the primary operating system. For synchronizing the timer of the primary operating system and as shown in FIG. 4, besides the main timer (MT) in the system driver a virtual timer (VT), with a lower clock rate runs and which is implemented by the clock rate of the primary operating system (POS) as soon as the corresponding time has actually elapsed. If the secondary operating system does not deliver the computing time for a longer time period, the clock for the primary operating system runs faster until the time difference has again been made up and specifically in the timing of the SOS timer. Therefore the clock in the primary operating system does not run slow.

While specific embodiments of the invention have been described in detail to illustrate the application of the principles of the invention, it will be understood that the invention may be embodied otherwise without departing from such principles.

The invention claimed is:

1. A method for operating a secondary operating system on a processor in addition to a primary operating system, the method comprising the steps of:
   switching from the primary operating system to the secondary operating system based on an interrupt call;
   loading a secondary operating system driver (SOS driver) of the primary operating system and activating said secondary operating system driver for loading and controlling said secondary operating system, said secondary operating system driver comprising an interrupt handling routine;
   exchanging interrupt tables of the operating systems during said interrupt call; and
   determining information stored in an interrupt table of the secondary operating system with said interrupt handling routine, said information corresponding to a point in the secondary operating system at which said interrupt call is to be serviced, wherein a program code filed in a tunnel area of a memory associated with the processor changes between the primary operating system and the secondary operating system.

2. Method according to claim 1, wherein the secondary operating system driver (SOS driver) subsequently loads the secondary operating system.

3. Method according to claim 1, wherein the secondary operating system driver loads the secondary operating system.

4. Method according to claim 1, wherein memory contexts are created in the central processing unit (CPU).

5. Method according to claim 1, wherein a change between the operating systems takes place by means of the SOS driver of the primary operating system and the board support package (BSP).

6. Method according to claim 1, wherein the secondary operating system controls a change to the primary operating system.

7. Method according to claim 6, wherein a change from the secondary operating system to the primary operating system takes place when the secondary operating system is idle.

8. Method according to claim 7, wherein a change from the secondary operating system to the primary operating system takes place through an instruction in the program sequence of the secondary operating system.

9. Method according to claim 1, wherein a change from the primary operating system to the secondary operating system takes place through an interrupt call.

10. Method according to claim 1, wherein the tunnel area of the memory consists of a single memory page.

11. Method according to claim 1, wherein interrupt calls of the primary operating system are inhibited during the secondary operating system sequence.

12. Method according to claim 1, wherein an interrupt servicing routine in the SOS operator reads the interrupt call table of the secondary operating system and the processing of the latter takes place or is continued at the point relative to the interrupt call.

13. Method according to claim 1, wherein for each interrupt associated with the secondary operating system, which is to initiate an interrupt call in the secondary operating system, the system driver generates an entry in the interrupt call table in the primary operating system, which in turn initiates a call of the corresponding interrupt servicing routine in the secondary operating system.

14. Method according to claim 1, wherein by means of an interrupt call servicing routine in the system driver, the information stored in the interrupt table of the secondary operating system (SOS) is determined as to the point in the latter where the running of the interrupt is to take place.

15. Method according to claim 1, wherein in the case of activity of the secondary operating system (SOS) following an interrupt request through the information stored in the interrupt call table of the secondary operating system as to the point in the latter where the running of the interrupt is to take place, the interrupt call servicing routine of the secondary operating system (SOS) is directly polled solely by the secondary operating system and not via the system driver.

16. Method according to claim 11, wherein after occurrence a corresponding interrupt call and determination of the point in the secondary operating system where interrupt running is to take place is determined, processing thereof at the point in the secondary operating system concerning the interrupt call is continued.

17. Method according to claim 1, wherein on changing from one operating system to the other all the system states of one operating system are stored.

18. Method according to claim 1, wherein on changing from one operating system to the other all system states of the other operating system are loaded.

19. Method according to claim 1, wherein clock generation for the secondary operating system takes place through the hardware timer.

20. Method according to claim 1, wherein clock generation for the primary operating system takes place through a clock system driver.

21. A device for operating a secondary operating system on a processor in addition to a primary operating system, the device comprising:
  a means for switching from the primary operating system to the secondary operating system based on an interrupt call;
  a secondary operating system driver (SOS driver) of the primary operating system for loading and controlling the secondary operating system is constructed;
  a function for exchanging interrupt tables of the operating systems, said secondary operating system driver comprising an interrupt service routine, said interrupt service routine determining information stored in an interrupt table of the secondary operating system corresponding to a point in the secondary operating system at which said interrupt call is to be serviced, wherein the SOS driver has a tunnel context setting routine for setting a tunnel context in the processor facilitating the change between operating systems by means of a program code filed in the tunnel context.

22. Device according to claim 21, wherein the tunnel context consists of a single memory page.

23. Device according to claim 21, wherein the SOS driver has an interrupt call table change routine for producing entries in the interrupt call table of the primary operating system, which at least take up entries for the interrupt calls for the secondary operating system.

24. Device according to claim 21, wherein the board support package (BSP) has a section for return to the primary operating system (POS).

25. Device according to claim 21, wherein the secondary operating system driver (SOS driver) has an interrupt table section by means of which it produces in the primary operating system an interrupt call table containing a call of an interrupt servicing routine for polling the secondary operating system.

26. Device according to claim 21, wherein the system driver is constructed for producing an entry in the interrupt call table in the primary operating system (POS) for each interrupt associated with the secondary operating system (SOS), which is intended to initiate an interrupt call in the secondary operating system and that the interrupt call table is constructed for polling the corresponding interrupt servicing routine in the secondary operating system (SOS).

27. Device according to claim 21, wherein an interrupt call servicing routine in the system driver is constructed for determining the information stored in the SOS interrupt table as to the point in the secondary operating system where interrupt running is to take place.

28. Device according to claim 21, wherein it is constructed in the case of activity of the secondary operating system (SOS) following an interrupt request through the information stored in the secondary operating system interrupt call table as to the point in which the secondary operating system interrupt running is to take place, so as to poll the interrupt call servicing routine of the secondary operating system directly solely through the secondary operating system and without passing via the system driver.

29. A method for operating a secondary operating system on a processor in addition to a primary operating system in which a change from the primary operating system to the secondary operating system takes place through an interrupt call, the method comprising the steps of:
  providing an interrupt call;
  switching from the primary operating system to the secondary system based on said interrupt call wherein a program code filed in a tunnel area of a memory associated with the processor switches between operating systems;
  providing the primary operating system with a secondary operating system driver, said secondary operating system driver comprising an interrupt call servicing routine;
  loading said secondary operating system driver in the primary operating system and activating said secondary operating system driver for loading and controlling the secondary operating system, said primary operating system having a primary operating system interrupt table, said secondary operating system having a secondary operating system interrupt table;
  replacing said primary operating interrupt table with said second operating system interrupt table during said interrupt call;
  processing information stored in said second operating system interrupt table with said secondary operating system driver such that said interrupt call servicing routine determines the information stored in the second operating system interrupt table as to the point in the secondary operating system where the running of the interrupt is to take place.

30. A device for operating a secondary operating system on a processor in addition to a primary operating system in which a change from the primary operating system to the secondary operating system takes place through an interrupt call, the device comprising:

a function configured to be executed by the processor to replace an interrupt table of the primary operating system with an interrupt table of the secondary operating system; and a secondary operating system driver of the primary operating system configured to be executed by the processor to load and control the secondary operating system, said secondary operating system driver comprising an interrupt call servicing routine, wherein said interrupt call servicing routine determines the information stored in the interrupt table of the secondary operating system as to the point where interrupt running is to take place in said secondary operating system, and wherein a program code filed in a tunnel area of a memory of the device and associated with the processor changes between operating systems.

* * * * *